United States Patent [19]

Sheaffer et al.

[11] Patent Number: 4,986,943

[45] Date of Patent: Jan. 22, 1991

[54] METHOD FOR OXIDATION STABILIZATION OF PITCH-BASED MATRICES FOR CARBON-CARBON COMPOSITES

[75] Inventors: Patrick M. Sheaffer, Lawndale; Jack L. White, Del Mar, both of Calif.

[73] Assignee: The Aerospace Corporation, El Segundo, Calif.

[21] Appl. No.: 316,746

[22] Filed: Feb. 28, 1989

[51] Int. Cl.$^5$ .............................................. C01B 31/02
[52] U.S. Cl. ..................... 264/29.1; 264/82; 264/136; 264/137; 423/447.4; 423/447.6; 423/449
[58] Field of Search ................. 264/29.1, 29.5, 29.6, 264/82, 136, 137, 257; 423/447.4, 447.6, 449

[56] References Cited

U.S. PATENT DOCUMENTS

| | | | |
|---|---|---|---|
| 3,476,703 | 11/1969 | Wadsworth | 423/447.6 X |
| 3,720,575 | 3/1973 | Cowlard | 423/447.6 X |
| 4,396,663 | 8/1983 | Mitchell et al. | 264/29.1 X |
| 4,490,201 | 12/1984 | Leeds | 264/29.5 X |

FOREIGN PATENT DOCUMENTS

| | | | |
|---|---|---|---|
| 2206701 | 8/1973 | Fed. Rep. of Germany | 264/29.1 |
| 62-273231 | 11/1987 | Japan | 264/29.1 |

*Primary Examiner*—Jeffery Thurlow
*Assistant Examiner*—Leo B. Tentoni
*Attorney, Agent, or Firm*—William J. Burke

[57] ABSTRACT

An oxidation process for stabilization of pitch-based matrices in the fabrication of carbon-carbon composites. By oxidizing a fiber preform impregnated with petroleum-derived mesophase pitch at temperatures in the range of 190° to 300° C. for periods of the order of ten hours, the matrix is fixed in place within the preform so that softening, bloating, and expulsion of the matrix are avoided when the body is carbonized. The invention can also be practiced to increase the carbon yield upon carbonization. Sufficient access porosity must exist in the matrix to permit oxidation throughout the composite body; this is normally formed in a preform due to the mismatch in thermal expansivities of fiber and matrix. Also, the softening point of the pitch must be above the oxidation temperature; this need can be met for most mesophase pitches. The process of oxidation stabilization can also be applied to isotropic pitches if these requirements are met, and to pitch derived from coal tar or other sources if the pitch is susceptible to oxidation. This invention may be practiced to reduce the time and cost of pitch-based composite fabrication, to eliminate the need for high-pressure carbonization, and thus to make pitch-based fabrication practical for large composite structures.

6 Claims, 2 Drawing Sheets

METHOD FOR OXIDATION STABILIZATION OF PITCH-BASED MATRICES FOR CARBON-CARBON COMPOSITES

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The general field of the invention is the fabrication of carbon-fiber-reinforced carbon-matrix composites, commonly referred to as carbon-carbon or C/C composites. The invention applies particularly to carbon-carbon composites fabricated with pitch-based matrices.

2. Description of the Prior Art

Although carbon-carbon composites now find a variety of applications, ranging, for example, from prosthetic implants to components for braking systems and heat exchangers, the major impetus for their further development continues to come from space and defense needs, where the high costs and lengthy processing times of conventional fabrication methods can be justified by unique capabilities of thermal and mechanical performance in the final composite product.

Two types of carbon-carbon composites are widely used: 3D composites that are essentially carbon bodies with some carbon fiber reinforcement effective in all directions, and 2D composites that are usually comprised of one or more parallel plies of fabric woven from carbon fiber. The 3D composites usually take the form of compact bodies that can be used to make nose cones or rocket nozzles for space vehicles. The 2D composites usually take the form of thin-walled tubes, plates, or other shell-like shapes that are particularly useful for structures where lightness, stiffness, and strength are primary considerations.

Three general methods are used in the current art of fabricating carbon-carbon composites. The carbon matrix may be deposited within a carbon fiber preform by: (1) chemical vapor infiltration (CVI) from hydrocarbon gases, such as methane or natural gas; (2) liquid impregnation with thermosetting resins that harden before carbonization reactions begin; or (3) impregnation with liquid pitches derived from petroleum or coal tar. Repetitive cycles of impregnation and carbonization are usually required to attain useful density levels. In fabrication practice, the method of impregnation may be varied from cycle to cycle.

As presently practiced, all processes are slow and expensive, and fail to realize fully the strength of the reinforcing fibers. Thus a situation has come to exist in which carbon-carbon composites find use in critical applications where no other material could serve, but serious constraints of cost, processing time, and reliability in fabrication limit their development for other applications where such properties as stiffness or refractoriness could provide substantial advantages over other structural materials.

In applying the process of chemical vapor infiltration, it is essential that an appreciable fraction of the reactive gas species diffuse into the full depth of the porous body before carbonization. To maintain such "throwing power," the process must be restricted to pressure and temperature conditions that make the CVI process inherently slow, expensive, and suitable primarily for thin-walled 2D composites. In practice, "bottleneck" pores limit the attainable density levels, and the formation of external crusts of pyrolytic carbon requires the process to be interrupted for cleaning between cycles. Nevertheless CVI processing is a significant competitor in the prior art of carbon/carbon fabrication and may find an important role in combination with liquid impregnation processes as a final infiltration step to control the degree of fiber-matrix bonding.

Thermosetting resins have been well-exploited for carbon-carbon fabrication because an extensive technology base (in fiber-reinforced plastics) exists for these matrices that can be fixed in place prior to carbonization. However this thermosetting characteristic also leads to the formation of glassy carbons that are inherently brittle, low in density, and difficult to graphitize. The commonly used impregnants are phenolic resins that carbonize with only modest yield; although higher-yield resins are being explored, they tend to be costly and lacking in technology base. The linear shrinkage in carbonization is typically about 20% and can cause severe fiber damage if benign patterns of shrinkage fracture do not form in the matrix. These difficulties require lengthy steps of curing and carbonization and a number of repetitive cycles to reach density levels of 1.65 g/ml.

Pitch-based processing methods emerged from the technology base established by the manufacture of artificial graphites. These processes seek to realize the advantages of high carbon yield, excellent graphitizability, and lower cost that are characteristic of pitches derived from coal tar or petroleum. Such pitches are comprised primarily of polynuclear aromatic molecules. Upon pyrolysis, reactions of aromatic polymerization carry the pitch through a liquid crystalline state, known as the carbonaceous mesophase, in which graphitizability is established by parallel alignment of the large flat aromatic molecules. Graphitizable precursors produce cokes of higher density, and graphitic matrices are less brittle than glassy carbon matrices.

These advantages have led to a substantial carbon-carbon fabrication technology based on pitch impregnants. However the carbonaceous mesophase is a viscous reactive liquid in the practical ranges of processing variables, and the gaseous reaction products cause bloating effects that can seriously reduce densification efficiency. That mesophase pitches bloat seriously upon carbonization, even under substantial applied pressures, is known from studies of petroleum coking in which foaming has been found to commence when the coke feedstock transforms to bulk mesophase, and the microstructure of the coke has been shown to depend on the amount of deformation by bubble percolation. Experience with pitch-based composite processing shows that it is difficult to achieve composite densities greater than 1.6 g/ml as long as room-pressure carbonization methods are used. Thus although the mechanisms defeating the attainment of high composite densities are different than in the case of processing with thermosetting resins, the ultimate practical density levels are comparable for the two conventional approaches to room-pressure densification by liquid impregnation.

The prior art solution to the difficulties of densification with pitch impregnants is to use an autoclave to apply high pressure during the pyrolysis process until the matrix hardens to coke. This approach is attractive not only to reduce the volume of bubble porosity within the matrix, but also because high-pressure pyrolysis offers a potential increase in carbon yield. In practice the autoclave systems are run at pressures of the order of 15 kpsi to temperatures of about 600° C. This necessarily involves a substantial capital investment in autoclaves, control equipment, and safety facilities. Furthermore high-pressure processing is limited by practical autoclave sizes.

However detailed analyses of the efficiency of carbon pickup within 3D preforms for each cycle of impregnation and carbonization reveal that the gains in densification by pressure pyrolysis are less than might have been expected. The difficulty in improving the efficiency appears to lie in the fact that the gases emitted during the final stages of mesophase formation and hardening are principally methane and hydrogen, both of which are non-condensable under the pyrolysis conditions. Although pressure applied during pyrolysis reduces the volume of gas evolved in the critical range of mesophase hardening, the volume is still sufficient to expel appreciable amounts of matrix from the fiber preform, and thus to reduce the cycle efficiency.

In fact some bubble porosity seems to be inevitable in any pitch-based process as long as thermal methods are used to harden the mesophase matrix, because the non-condensable gases are essential products of the polymerization reactions that effect the hardening. In this sense high-pressure pyrolysis is an incomplete and less than satisfactory solution to the problem of attaining efficiency in pitch-based densification.

3. Objects of the Invention

The immediate and direct object of the present invention is to provide a means of fixing pitch-based matrices in place within fiber preforms so that carbonization processes may be applied in composite fabrication without the risk of matrix expulsion from the preform by pyrolysis generated gases. It is also the object of this invention to stabilize the matrix micro- structure, as established by the impregnation process, to survive carbonization without modification. It is a further object to enhance the carbon yield of the pitch matrix in the carbonization process.

Another immediate and direct object of the present invention is to eliminate the need for costly high-pressure pyrolysis and carbonization facilities in the pitch-based processing of carbon-carbon composites. It is also the object to reduce fabrication costs by using cheap materials and reactants, for example, petroleum or coal-tar pitch as matrix precursor, and using air to oxidize the matrix.

These specific objects contribute to several general objectives. By eliminating the need for high-pressure facilities, pitch-based fabrication can be extended to 2D composite structures that are too large to be economically treated in high-pressure autoclave systems. By avoiding matrix expulsion and enhancing carbon yield, the number of process cycles required to attain desired density levels in both 2D and 3D composites can be reduced, with attendant economies in time and cost.

By providing a means of retaining pitch-based matrices in place during carbonization, the process of oxidation stabilization can be combined with any process for putting a pitch or mesophase pitch matrix into place. In this way the art of pitch-based composite fabrication can be enlarged to use a broader range of impregnation or injection processes.

SUMMARY OF THE INVENTION

The process of oxidation stabilization described here is a means of fixing a pitch-based matrix in place within a fiber preform so that matrix softening, bloating, and expulsion are avoided when the body is carbonized. The invention also increases the carbon yield of the matrix upon carbonization. The concept emerged from the discovery that oxidation stabilization, essentially as practiced in the manufacture of mesophase carbon fiber, could be applied to a fiber preform that had been impregnated with a petroleum-derived mesophase pitch.

Although the solid-state oxidation of mesophase pitch proceeds by conventional diffusion-limiting mechanisms, the shrinkage cracks commonly present within a mesophase body can provide access for oxygen to the interior to enable oxidation to progress effectively throughout the body. Thus two essential requirements for success in the oxidation stabilization of a mesophase body, including fiber preforms impregnated with mesophase pitch, are that sufficient access porosity be present throughout the body and that the matrix behaves as a solid at the temperature of oxidation, generally between 190° and 320° C.

Oxidation stabilization works well for mesophase pitch matrices because the strong mismatch in thermal expansivities of mesophase and carbon fiber produces an extensive and well-connected pattern of access cracks. Furthermore mesophase pitches are well advanced in pyrolysis and thus possess high softening points.

Oxidation stabilization can also be applied to isotropic premesophase pitch provided that there is sufficient access porosity and that the oxidation temperature is below the softening point of the pitch.

DETAILED DESCRIPTION OF THE PREFERRED EMBODIMENT

Figure 1:
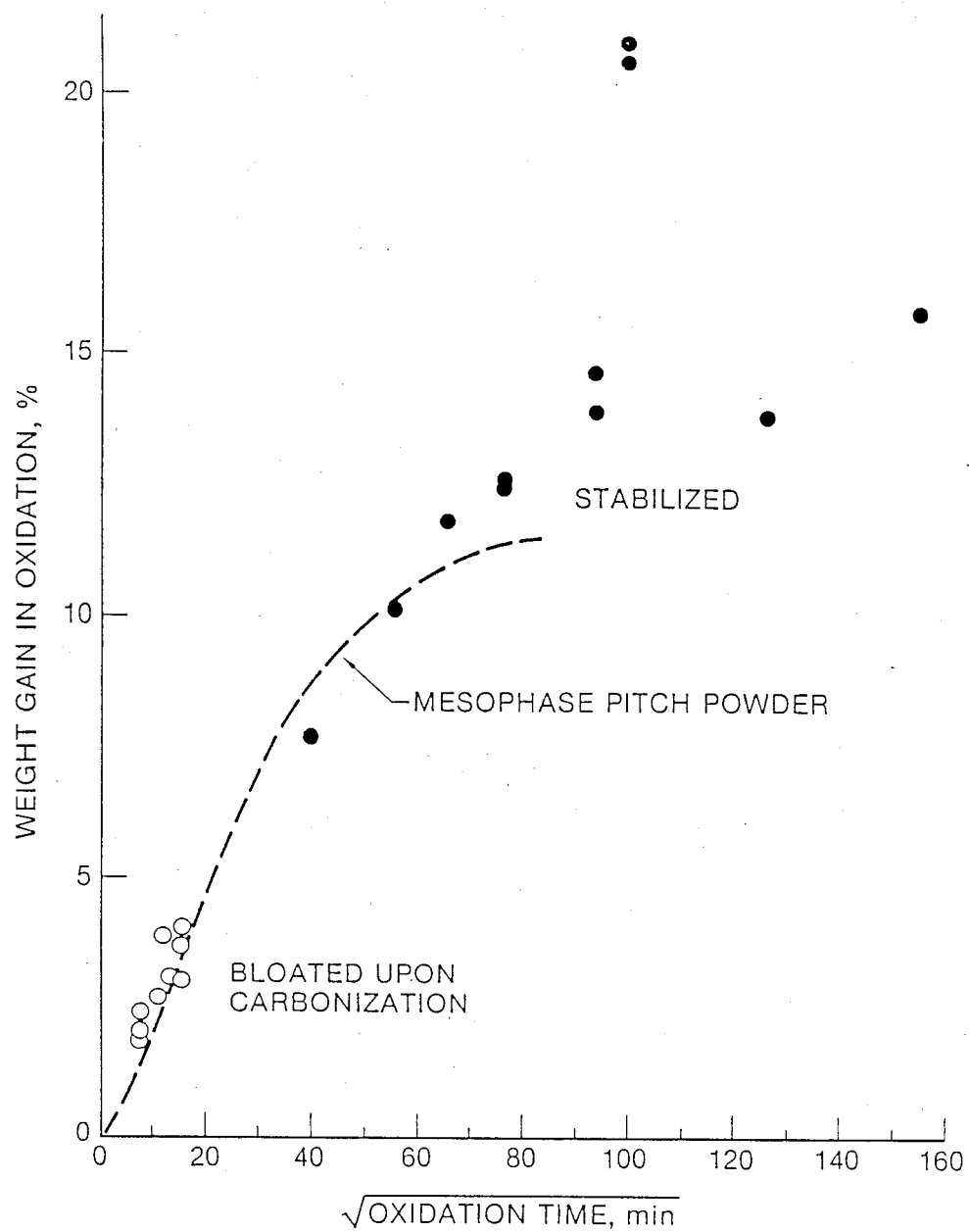
FIG. 1 is a chart of the weight gains, relative to matrix content, of specimens cut from a 2D fiber preform impregnated with mesophase pitch and oxidized at 220° C.

Applicants have discovered that densification efficiency in the pitch-based processing of carbon-carbon composites is enhanced by applying an oxidation treatment to stabilize the matrix in place within the fiber preform prior to the carbonization step. The increased efficiency results from two independent physical and chemical effects obtained by oxidative cross-linking of the aromatic molecular constituents of the pitch-based matrix: (1) physical melting, bloating, and expulsion of the matrix from the preform are prevented during carbonization, and (2) less carbon is lost from the matrix material in the chemical reactions of carbonization, i.e., the carbon yield of the matrix material is increased.

Oxidation stabilization is a key step in the manufacture of carbon fiber spun from mesophase pitch. To maintain the strong preferred orientation established by the extensive flow during spinning, and to prevent softening and bubble formation within the filaments during heat treatment, the green fiber is oxidized before carbonization. The oxidizing temperature is generally held below 300° C. to avoid structural changes in the oriented mesophase while oxidation is in progress. The stabilization process is limited by solid-state diffusion to filament diameters of the order of 15 microns, because mesophase filaments do not generally possess a structural porosity giving gaseous access to the interior of the filament.

In application to composite processing, oxidation stabilization is particularly useful for mesophase pitch matrices, in which bloating tendencies are very strong. As in the case of mesophase carbon fiber, oxidation can be used to retain special microstructures, e.g., fibrous microstructures imposed by injection of mesophase pitch into the fiber preform. The oxidation does not affect the graphitizability, which is determined by the extent of mesophase transformation established before the oxidation.

The starting materials for the oxidation stabilization process may be 1D, 2D or 3D carbon fiber preforms that have been impregnated with a pitch or mesophase pitch derived from petroleum, coal tar, or any similar tar-bearing source by chemical, extractive, or thermal treatments. Impregnation may be accomplished by any process that causes the pitch or mesophase pitch to enter the interstices of the 1D, 2D or 3D preform, including dipping, wicking, prepregging, pressure cycling, or mechanical injection.

The formation of a connected porosity in the matrix to provide access for oxygen gas to all regions of the composite is essential to success in the stabilization process. In a carbon fiber preform impregnated with a pitch of high softening point, an adequate access porosity often forms by simple cooling to room temperature. This porosity is due to shrinkage cracking caused by the mismatch in thermal expansivities of fiber and matrix operating over the temperature region from the softening point of the pitch to the cooling temperature. Partial closure of the cracks will occur on heating to the oxidation temperature. Thus higher softening points and lower oxidation temperatures are favorable to adequate access porosity and successful stabilization. In the case of mesophase pitch impregnants, the effect of differences in thermal expansivities between matrix and fiber is enhanced by the anisotropy in expansivity of the bulk mesophase itself; this anisotropy is sufficiently strong to develop an extensive system of shrinkage cracks in the absence of carbon fibers.

The impregnated and cooled composite preform is placed in a conventional furnace and heated to the oxidation temperature in a stream of oxidizing gas. Temperatures may vary generally between 190° and 300° C., such that the temperature remains below the softening point of any microconstituent of the impregnant. The matrix then absorbs oxygen through the microcrack network and polymerizes to an infusible solid. This absorption is manifested by appreciable weight gains by which the oxidation process may be monitored.

In the preferred embodiments, the impregnant pitch is prepared from a petroleum pitch. Ashland A240 petroleum pitch is an example of a suitable precursor. After thermal or chemical treatment to increase its softening point, the resulting pitch, mesophase pitch, or mesophase demonstrates the ability to be stabilized by absorption of oxygen. Other impregnants that may be derived from coal tar or other pitch-like materials may also yield the desired results. In order to determine if a particular pitch is suitable for the oxidation stabilization process, certain tests may be performed. Three such tests are summarized below, to be applied to the pitch after treatment to the condition in which the pitch will serve as impregnant.

First Test

Measure the heat liberated, in the temperature range below that of burning, of a sample of powdered impregnant immersed in oxygen and slowly heated (e.g., less than one degree per minute) in a differential scanning calorimeter or similar instrument. A positive indication for stabilizability is given if this heat approximates that of a similar sample of mesophase pitch prepared from Ashland A240 petroleum pitch.

Second Test

Using a thermal gravimetric analyzer measure the weight changes on heating powdered impregnant slowly (1) in oxygen and (2) in an inert gas. A positive weight gain in oxygen, relative to the weight change in inert gas, indicates the favorable temperature range for oxidation stabilization. Selecting an oxidation temperature from these results or the differential calorimetric data observed in the first test (above), oxidize a sample of powdered impregnant isothermally for a period of the order of one day. A positive indication for stabilizability is given if a significant weight gain (above 5 percent) is observed.

Third Test

Heat a sample of the powdered impregnant in oxygen or air, at temperatures below that of burning and preferably those indicated by the foregoing tests, until a significant amount of oxygen is absorbed (of the order of five percent weight gain). Then heat the sample under the compacting pressure of a piston or weight (e.g., less than 10 psig) and observe the integrity of the compacted material. A strong positive indication for stabilizability is given if the powder resists melting or sintering to a solid body.

In addition to the above tests, chemical analytical methods may be used to determine if the oxyqen content of the oxidized impreqnant is likely to achieve the stabilized condition. An oxygen-to-carbon atomic ratio in excess of 0.1 is a favorable indication of stabilization.

The nature of petroleum and coal-tar pitches is such that their susceptibilities to oxidation vary widely. Although the above tests offer strong indications of the susceptibility of an impregnant to oxidation stabilization, it is not possible to establish an absolute criterion for stabilizability short of manufacturing sample composites, oxidizing the sample composites under conditions indicated by the above tests, and conducting the carbonization tests. Visual observations to prove the matrix does not exude from the composite may be supplemented by micrographic examination of the matrix microstructure.

FIG. 1 presents the results of a series of such oxidation and carbonization tests applied to specimens cut from a 2D fiber panel impregnated with mesophase pitch derived from Ashland A240 petroleum pitch. The oxidizing gas was oxygen, and the oxidation temperature was 220° C. The weight gain in oxidation, relative to the matrix content of the impregnated composite, is plotted as a function of the square root of time in minutes to permit the full range of exposure times to be given in a single plot. A thermogravimetric curve for mesophase pitch powder also prepared from Ashland A240 petroleum pitch is included to show that the matrix pitch oxidizes approximately as rapidly as the powdered pitch. The carbonization tests showed that all specimens oxidized for more than one day, or to a weight gain of more than eight percent, had been stabilized.

Figure 2:
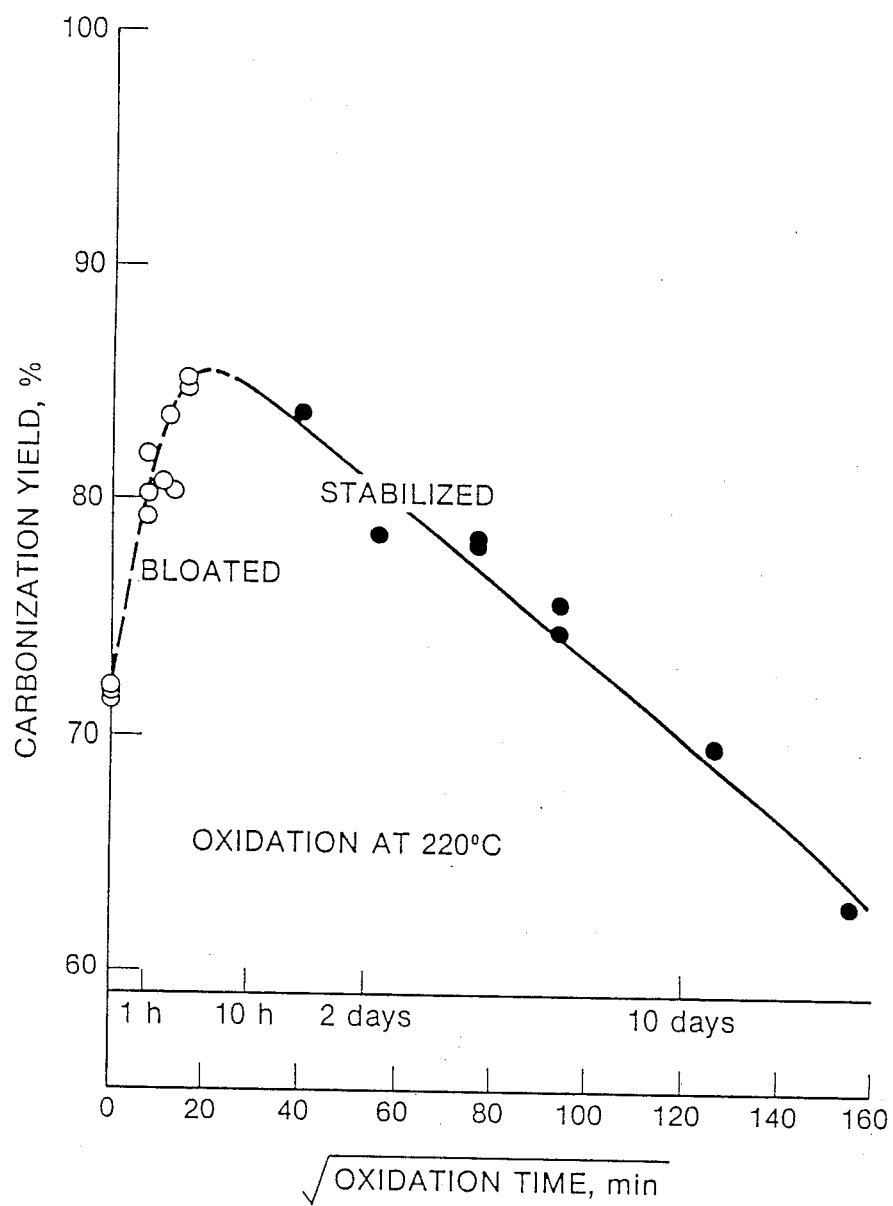
FIG. 2 is a chart of the carbon yields, relative to matrix content, in the carbonization of the oxidized specimens of FIG. 1.

FIG. 2 presents results for the carbon yields, relative to the matrix content, after carbonization under nitrogen to 1000° C. It is clearly evident that major improvements in carbon yield, relative to the unoxidized matrix, can be attained by using oxygen exposure times just sufficient to attain full stabilization.

General guidelines by which the process parameters are applied are as follows. Increasing the oxygen content of the oxidizing atmosphere around the impregnated preform is effective in increasing the depth and rate of oxygen absorption. Pure oxygen is recommended but may be substituted for, perhaps for economic reasons, by air. Increasing the temperature of oxidation increases the rate of oxygen absorption up to a temperature where carbon burnoff begins to compete with oxygen absorption, this being in the neighborhood of 250° to 300° C.

The optimum temperature for oxidation must represent tradeoffs between minimum processing time, favored by higher temperature, and maximum carbon yield, favored by lower temperature. Greater depths of oxygen penetration (in the solid impregnant) can be attained at lower oxidation temperatures. For mesophase pitch derived from Ashland A240 petroleum pitch, oxidation temperatures in the range of 190 to 230° C are favored.

The process of oxidation stabilization is particularly well suited to thin-walled 2D composites and thus opens this class of composites to pitch-based processing. Heavy-walled or massive composites may require the use of air or more dilute oxidizing atmospheres to avoid spontaneous combustion or thermal excursions in the depth of the composite. This effect is of concern when the composite is massive and constructed of fiber of low thermal conductivity.

The most significant potential of oxidation stabilization lies in opening the field of pitch-based composite fabrication to a wider range of processing concepts than could be applied as long as thermal methods were the only means available to try to fix a graphitizable matrix in place within the fiber preform. Mesophase fluidity no longer appears as part of the problem of matrix bloating, but as a property that may be exploited for its potential in improving densification methods and producing favorable matrix microstructures.

By incorporating oxidation stabilization, composite fabrication can be pursued by room-pressure methods, thus eliminating the cost of high-pressure autoclaves, their control systems, and the safety precautions essential to their use. By eliminating the need for autoclave systems, very large structural composites can be economically densified by pitch-based methods. By eliminating the expulsion of matrix by pyrolysis gases, each cycle of densification is made more efficient and fewer cycles are required to reach desired density levels. Further time economies come from the fact that lengthy steps of low heating rate are unnecessary, in contrast to the conventional processing of preforms impregnated with either pitch-based or thermosetting resin matrices.

Finally, the process of oxidation stabilization can be applied to both isotropic pitch and mesophase, thus opening another microstructural variable to explore in optimizing the properties of the finished composites. The only essential requirements are that the matrix be susceptible to oxidation at temperatures where it remains solid, and that sufficient porosity forms by anisotropic shrinkage to give oxygen access throughout the composite body.

What is claimed is:

1. A process for the fabrication of carbon fiber reinforced carbon matrix composites to a desired shape comprising the steps of:
   a. configuring a lattice-work of carbon fibers to the desired shape of a reinforced composite;
   b. infiltrating the lattice-work with a pitch based matrix precursor;
   c. oxidizing the infiltrated lattice-work to stabilize the matrix during subsequent carbonization; and,
   d. carbonizing the infiltrated, oxidized lattice-work.

2. The process as defined in claim 1 wherein the oxidation of the pitch based precursor is performed at a temperature from about 190° to 300° C. and at ambient pressure, thereby minimizing dimensional change of the shaped composite and maximizing carbon yield of the precursor.

3. The process as defined in claim 2 wherein the oxidation of pitch based precursor is carried out for a time whereas the dimensional change of the shaped composite and carbon yield of the precursor after carbonization are optimized, said time being approximately ten hours.

4. The process as defined in claim 1 wherein the lattice-work is impregnated by a series of partial impregnations and each of said series is oxidized in sequence; and the carbonization of the matrix precursor is performed after the last of said series of partial impregnations is oxidized.

5. The process as defined in claim 1 wherein exposure to oxygen is controlled to maximize the carbon yield in carbonization.

6. The process of claim 1 wherein the time and temperature of exposure to oxygen is controlled to minimize the dimensional change of the shaped composite during carbonization.

* * * * *